United States Patent
Wouhaybi et al.

(10) Patent No.: US 11,292,133 B2
(45) Date of Patent: Apr. 5, 2022

(54) METHODS AND APPARATUS TO TRAIN INTERDEPENDENT AUTONOMOUS MACHINES

(71) Applicant: Intel Corporation, Santa Clara, CA (US)

(72) Inventors: Rita H. Wouhaybi, Portland, OR (US); Shekoufeh Qawami, El Dorado Hills, CA (US); Hassnaa Moustafa, Portland, OR (US); Chaitanya Sreerama, Hillsboro, OR (US); Nadine L. Dabby, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 670 days.

(21) Appl. No.: 16/145,796

(22) Filed: Sep. 28, 2018

(65) Prior Publication Data

US 2019/0047149 A1   Feb. 14, 2019

(51) Int. Cl.
*G05B 19/04* (2006.01)
*B25J 9/16* (2006.01)
(Continued)

(52) U.S. Cl.
CPC ............ *B25J 9/1682* (2013.01); *B25J 9/163* (2013.01); *B25J 9/1666* (2013.01); *B25J 9/1669* (2013.01);
(Continued)

(58) Field of Classification Search
CPC ........ B25J 9/163; B25J 9/1666; B25J 9/1669; B25J 9/1682; B25J 9/1697; G06N 20/00;
(Continued)

(56) References Cited

U.S. PATENT DOCUMENTS

| | | | | |
|---|---|---|---|---|
| 4,495,588 A | * | 1/1985 | Nio | ......................... B25J 9/161 318/568.2 |
| 4,708,175 A | * | 11/1987 | Janashak | .............. B25J 15/0019 141/1 |

(Continued)

FOREIGN PATENT DOCUMENTS

WO    2018053187    3/2018

OTHER PUBLICATIONS

A.I. Wiki, "A Beginner's Guide to Deep Reinforcement Learning," Skymind, retrieved online "file:///H:/20002%20(Intel)/AB0986-US/File%20History/IDS%20to%20cite/A%20Beginner's%20Guide%20to%20Deep%20Reinforcement%20Learning%20_%20Skymind.html" on Sep. 27, 2018, 31 pages.

(Continued)

*Primary Examiner* — Harry Y Oh
(74) *Attorney, Agent, or Firm* — Hanley, Flight and Zimmerman, LLC

(57) ABSTRACT

Methods and apparatus to train interdependent autonomous machines are disclosed. An example method includes performing an action of a first sub-task of a collaborative task with a first collaborative robot in a robotic cell while a second collaborative robot operates in the robotic cell according to a first recorded action of the second collaborative robot, the first recorded action of the second collaborative robot recorded while a second robot controller associated with the second collaborative robot is trained to control the second collaborative robot to perform a second sub-task of the collaborative task, and training a first robot controller associated with the first collaborative robot based at least on a sensing of an interaction of the first collaborative robot with the second collaborative robot while the action of the first sub-task is performed by the first collaborative robot (Continued)

and the second collaborative robot operates according to the first recorded action.

20 Claims, 5 Drawing Sheets

(51) Int. Cl.
| | | |
|---|---|---|
| *G06N 3/08* | (2006.01) | |
| *G06N 5/04* | (2006.01) | |
| *G06N 20/00* | (2019.01) | |
| *G06N 3/04* | (2006.01) | |
| *G06N 3/00* | (2006.01) | |

(52) U.S. Cl.
CPC ............ *B25J 9/1697* (2013.01); *G06N 3/008* (2013.01); *G06N 3/0454* (2013.01); *G06N 3/08* (2013.01); *G06N 5/046* (2013.01); *G06N 20/00* (2019.01); *G05B 2219/39156* (2013.01)

(58) Field of Classification Search
CPC .......... G06N 3/08; G06N 5/046; G06N 3/008; G06N 3/0454; A47J 37/06; A47J 37/07; G05B 2219/39136; G05B 2219/39156; G05B 2219/39164; G05B 2219/40499
See application file for complete search history.

(56) References Cited

U.S. PATENT DOCUMENTS

| | | | | |
|---|---|---|---|---|
| 4,888,707 A * | 12/1989 | Shimada | ............ | G05B 19/4061 700/255 |
| 4,998,050 A * | 3/1991 | Nishiyama | ............. | B25J 9/1666 700/248 |
| 5,136,223 A * | 8/1992 | Karakama | ............ | G05B 19/425 318/573 |
| 6,634,097 B1 * | 10/2003 | Ikeda | ...................... | B62D 65/00 29/783 |
| 9,753,453 B2 * | 9/2017 | Benaim | ................... | G06F 30/00 |
| 11,036,191 B2 * | 6/2021 | Ooba | ..................... | G06N 3/006 |
| 2009/0193912 A1* | 8/2009 | Roehl | ...................... | A24C 5/34 73/864.32 |
| 2009/0210175 A1* | 8/2009 | Bilpuch | .................. | G01M 3/24 702/51 |
| 2010/0161123 A1* | 6/2010 | Ando | ..................... | B25J 9/1682 700/248 |
| 2011/0046783 A1* | 2/2011 | Benchikh | ............... | B25J 9/1671 700/254 |
| 2011/0166703 A1* | 7/2011 | Byrne | .................... | B25J 9/1682 700/246 |
| 2013/0236050 A1* | 9/2013 | Choi | ...................... | B25J 9/1656 382/103 |
| 2014/0288706 A1* | 9/2014 | Asahi | ..................... | B25J 9/1656 700/250 |
| 2015/0127124 A1* | 5/2015 | Kobayashi | ............. | B25J 9/1689 700/83 |
| 2015/0127155 A1* | 5/2015 | Passot | ...................... | B25J 9/161 700/257 |
| 2015/0339570 A1* | 11/2015 | Scheffler | ................... | G06N 3/04 706/16 |
| 2016/0059414 A1* | 3/2016 | Cheng | .................. | G05B 19/408 700/264 |
| 2016/0199975 A1* | 7/2016 | Brooks | ................ | G05B 19/427 700/248 |
| 2016/0288323 A1* | 10/2016 | Muhlig | ................... | B25J 9/1656 |
| 2017/0348854 A1* | 12/2017 | Oleynik | ................... | A47J 47/02 |
| 2018/0250818 A1* | 9/2018 | Maeda | .................... | B25J 9/0084 |
| 2018/0257227 A1* | 9/2018 | Washizu | .................. | B25J 9/163 |
| 2018/0290299 A1* | 10/2018 | Kawaguchi | ............... | B25J 9/163 |
| 2018/0339456 A1* | 11/2018 | Czinger | ................ | G05B 19/418 |
| 2018/0343385 A1* | 11/2018 | Mimura | ................. | H04N 7/185 |
| 2018/0354127 A1* | 12/2018 | Ando | ..................... | B25J 9/1628 |
| 2019/0071261 A1* | 3/2019 | Wertenberger | ....... | B25J 15/0052 |
| 2019/0126487 A1* | 5/2019 | Benaim | ..................... | B25J 9/163 |
| 2019/0196447 A1* | 6/2019 | Kreig | ....................... | F16B 5/121 |
| 2019/0291277 A1* | 9/2019 | Oleynik | .................. | B25J 9/1669 |
| 2019/0375112 A1* | 12/2019 | Mariyama | ............ | G06N 3/0445 |
| 2020/0026246 A1* | 1/2020 | Nakagawa | .......... | G05B 13/0265 |
| 2020/0030970 A1* | 1/2020 | Mariyama | ................ | B25J 9/163 |
| 2020/0055183 A1* | 2/2020 | Ito | ............... | B25J 5/00 |
| 2020/0316675 A1* | 10/2020 | Salas-Loranca | .......... | B22C 9/02 |
| 2020/0338722 A1* | 10/2020 | Jang | ..................... | G06N 3/0454 |

OTHER PUBLICATIONS

European Patent Office, "Extended European Search Report," issued in connection with European Patent Application No. 19183059. 5, dated Jan. 16, 2020, (9 pages).

Sørensen et al., "Automatic Parameter Learning for Easy Instruction of Industrial Collaborative Robots," Apr. 30, 2018, IEEE International Conference on Industrial Technology (ICIT), pp. 87-92.

European Patent Office, "Communication pursuant to Article 94(3) EPC," issued in connection with European Patent Application No. 19183059.5, dated Sep. 28, 2021, 5 pages.

* cited by examiner

METHODS AND APPARATUS TO TRAIN INTERDEPENDENT AUTONOMOUS MACHINES

FIELD OF THE DISCLOSURE

This disclosure relates generally to autonomous machines and, more particularly, to methods and apparatus to train interdependent autonomous machines.

BACKGROUND

Autonomous machines (e.g., robots) are increasingly being deployed (e.g., used, operated, installed, etc.) in groups (e.g., cells, etc.) that collaborate to perform a shared task (e.g., a common task, a collaborative task, etc.). An example collaborative task is the assembly of a car door to a car body. In an example, one robot attaches hinges to a door being held by another robot, and the other robot attaches the door to the car body using the hinges. The robots perform the three example interdependent sub-tasks (e.g., actions, steps, processes, etc.) of holding the door, attaching the hinges to the door, and attaching the door to the car body using the hinges.

Figure 1:
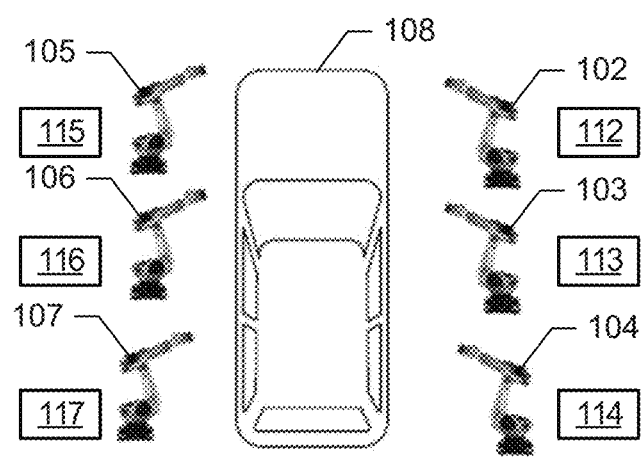
FIG. 1 illustrates an example robotic cell constructed in accordance with teachings of this disclosure and shown in an example environment of use.

As beneficial, the same reference numbers will be used throughout the drawing(s) and accompanying written description to refer to the same or like parts. The figures are not to scale. Connecting lines or connectors shown in the various figures presented are intended to represent example functional relationship, physical couplings, and/or logical couplings between the various elements.

DETAILED DESCRIPTION

Today, in many industrial settings robots are given very specific, disparate tasks to perform. In these environments, the robot controller associated with each robot is typically trained independently by a person who characterizes the robot's physical environment, collects datasets which are used to train, test, and deploy a robot controller that will be used to operate the robot. Because the robots are trained independently, the complexity to train a system with N robots is at least of order N. Because of the complexity to traditionally train a group of robots, the number of robots in a group may be limited.

To perform a collaborative task using multiple collaborative robots, the robots perform multiple interdependent sub-tasks (e.g., complimentary sub-tasks, mutually dependent sub-tasks, etc.), and the functions of each robot effect other robots with which the robot is collaborating. Collaborative robots work together, in concert, in coordination, etc. with each other to perform a collaborative task. However, the interrelatedness of the sub-tasks and the corner cases associated with these sub-tasks being carried out at the same time are difficult to characterize and train. As a result, prior techniques for training robots tend to lack training regarding deviations that may occur in movement, operations, etc. of one or more of the collaborative robots. This increases the likelihood that a robotic cell (e.g., a group of robots) will fail (e.g., stop working as intended) and require human intervention to bring back online. If prior techniques were used to train robots to accommodate such additional factors, the complexity required to train the N robots would far exceed order N. This excessive growth in complexity further limits the scalability of robotic cells. For ease of discussion, references will be made to collaborative task (e.g., a task such as assembling a door to a car body that a robotic cell carries out), sub-tasks (e.g., tasks that individual robots carry out to collectively assemble the door to the car body), and actions (e.g., actions, movements, steps, etc. a robot carries out to carry out their sub-task). However, other terminology may be used.

Reference will now be made in detail to non-limiting examples, some of which are illustrated in the accompanying drawings, that overcome at least the above deficiencies by configuring autonomous machines to collaboratively train on another to account for interdependencies therebetween.

FIG. 1 illustrates an example robotic cell 100 (e.g., group, etc.) of autonomous machines in the form of collaborative robots 102, 103, 104, 105, 106 and 107 that collaborate in the performance of a collaborative task, such as assembling a portion of an automobile 108. In some examples, the collaborative robots 102-107 perform sub-tasks that collectively realize the collaborative task by performing corresponding interdependent operations. Example interdependencies between the sub-tasks performed by the robots 102-107 include, but are not limited to, variation(s) of motion (e.g., a robot may not move exactly the same each time), speed of motion, time(s) of motion (e.g., a robot may not be able to start its sub-task until another robot finishes its sub-task), robot size(s), robot shape(s), restriction(s) on how a robot can move based on how another robot is currently positioned), etc. As described below in connection with FIG. 2, robot controllers 112, 113, 114, 115, 116 and 117 associated with respective ones of the example robots 102-107 can be trained to overcome challenges associated with prior techniques of training robotic cells that operate with such interdependencies between tasks. That is, examples disclosed herein include deep reinforced learning across the robot controllers 112-117 so that the robot controllers 112-117 autonomously train themselves to operate their corresponding robots based on goals and based on action(s) of one or more of the other robots 102-107. For example, the robot controllers 112-117 may be trained using the example program of FIG. 4. Deep reinforced learning of a machine learning engine (e.g., a convolutional neural network) is a form of deep learning useful in training systems with describable characteristics, such as robotics. As used herein, unsupervised (e.g., not using known target outputs) deep reinforced learning trains a robot controller to control a robot to carry out a sequence of actions that leads to the robot performing a specified sub-task subject to one or more physical and/or time constraints. Machine learning engines train by adapting internal coefficients. The larger the absolute value of a coefficient, the stronger one node of the machine learning engine effects another node. As the machine learning engine converges, its output(s) for the same input(s) will change by smaller and smaller amounts over time. Analogously, as the machine learning engine converges, its internal coefficients will change by smaller and smaller amounts as input(s) are repeated. In this manner, the robot controllers 112-117 self-learn interdependencies between the robots 102-107, thereby allowing the robotic cell 100 to, for example, perform the shared task faster, with less errors, with less faults, using less floor space, with lower training complexity, with less training time, etc.

After training, the robots 102-107 can perform complimentary sub-tasks that, when performed, perform a collaborative task. For example, a first robot performs a first complimentary sub-task of attaching a hinge to a door, and a second robot performs a second complimentary sub-task of attaching the door to the car body using the hinge. The first and second sub-tasks are interdependent and complimentary sub-task (e.g., one sub-task cannot be performed without the other sub-task) that together represent a collaborative task of assembling a door to a car body. The robots perform the two example interdependent sub-tasks (e.g., actions, steps, processes, etc.) of attaching the hinge to the door, and attaching the door to the car body using the hinge. In some examples, the first and second robots are part of a robotic cell in a manufacturing environment that performs a manufacturing task (e.g., assemble a door to a car body).

Figure 2:
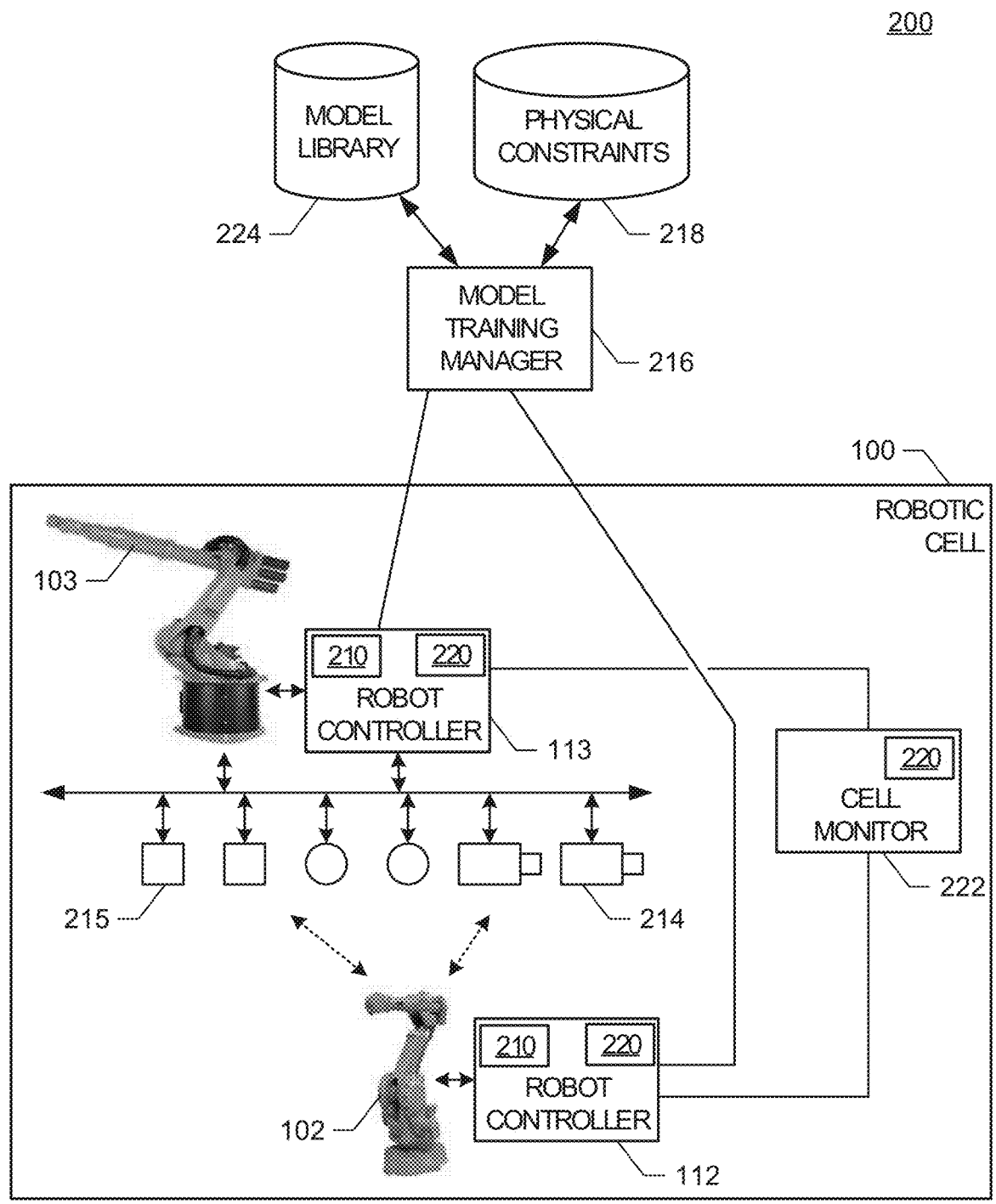
FIG. 2 is a block diagram of an example training system constructed in accordance with teachings of this disclosure and shown in an example environment of use.

FIG. 2 is a block diagram of an example training system 200 constructed in accordance with teachings of this disclosure that may be used to train interdependencies in a robotic cell, such as the example robotic cell 100 of FIG. 1. A portion of the example robotic cell 100 is shown in FIG. 2 including the example robot 102 and the example robot 103. To control the robot 102 and the robot 103, the example robotic cell 100 of FIG. 2 includes the example robot controller 112 and the example robot controller 113 for respective ones of the example robot 102 and the example robot 103. The robot controllers 112, 113 may be implemented separately from the robots 102, 103, as shown, and/or may be part of the robots 102, 103.

In the illustrated example of FIG. 2, the robot controller 112 is trained using traditional training methods to control the robot 102 as a standalone robot. For example, the robot controller 112 can be trained without information regarding the sub-task(s) to be performed by the robot 103. During training of the robot controller 112, actions performed by its corresponding robot 102 are recorded. In some examples, the recorded information corresponds to the motion(s), variation(s), etc. of the robot 102 recorded while the robot controller 112 was trained.

In the illustrated example of FIG. 2, the example robot controller 113 is trained to learn its sub-tasks as well independencies between its corresponding robot 103 and the robot 102. That is, the robot controller 113 is trained based on programmed goals, physical constraints, and analyses of sensor data representing observations of preceding robot(s) participating in a collaborative task. Accordingly, the robot controller 113 learns to control the robot 103 to perform the sub-tasks of the robot 103 taking into account (e.g., considering, based on, in the presence of, etc.) its interdependencies with other robots, such as the robot 102. In some examples, after the robot controller 113 is trained, the robot controller 113 and the robot controller 112 are further (e.g., additionally) trained while the robot 103 and the robot 102 are both performing their sub-task(s), thereby allowing the robot controller 113 and the robot controller 112 to (further) learn their interdependencies. While the example of FIG. 2 includes training interdependencies between the robot 102 and the robot 103, interdependencies may be trained between any number of robots using teachings of this disclosure. For example, a robot may learn interdependencies with multiple other robots and, likewise, multiple robots may learn interdependencies with the same robot.

In this disclosure references are made to training a robot controller associated with a robot. Additionally, and/or alternatively, in some examples, a robot controller is part of a robot and, thus, one may alternatively refer to training the robot.

To sense position information for the robot 103, the example training system 200 includes any number(s) and/or type(s) of sensor(s). Example sensors include, but are not limited to, a camera 214, a motion sensor 215, a proximity sensor, a contact sensor, a pressure sensor, a sound sensor, a navigation and/or GPS sensor, an accelerometer, a gyroscopes, an Inertial Measurement Unit (IMU) sensor, a temperature sensor, alight sensor, etc.

To train the robot controller 112 and the robot controller 113, the example training system 200 of FIG. 2 includes an example model training manager 216. During training of a robot controller 112, 113, the example model training manager 216 of FIG. 2 provides to the robot controller 112, 113 being trained its applicable physical and/or time constraint parameter(s) information from a physical constraints database 218. Example physical constraint parameters include boundaries of physical motion for the robot associated with a robot controller being trained, the boundaries of physical motion for other robots, physical boundaries of humans, physical boundaries of target object(s), location boundaries of target object(s), structural constraints, laws of physics, other physical restraints, limits, boundaries, etc. In some examples, the physical constraint parameters for robot movement are based on what is feasible in terms of reach, and/or are specified to ensure a specific robot does not lose balance, does not become unusable, or does not cause harm to its environment (e.g., to another robot). In some examples, some physical constraint parameters include time-based parameters such that a physical constraint is enforced, valid, or applicable during a particular time, a particular sequence of actions and/or sub-tasks a robot is to perform, the one or more sub-tasks that are part of the same collaborative task. For example, a physical constraint parameter of a grip claw may be time constrained based on a sequence of operations to not open/release until a car door is securely fastened by another robot to a car body. Another example time-based parameter of a physical constraint parameter may be that a paint spray robot is not to spray during a portion of a timeline of a collaborative task. The example physical constraint database 218 of FIG. 2 may be implemented using any number and/or type(s) of data structures, and may be stored on any number and/or type(s) of non-transitory computer-readable storage device and/or storage disk such as a memory, a digital versatile disk (DVD), a compact disc (CD), a Blu-ray disk, etc. including the data structure(s).

In some examples, the robot controllers 112, 113 include a computer vision processor 220 that identifies when a robot, object, etc. is near to or has violated a defined physical boundary (e.g., a boundary violation). The physical boundaries can be defined explicitly by a human and/or indicated on a video stream which can then be used to detect compliance of a robot (e.g., the robot 103) to the boundary(-ies) by the video camera 214 and sent to the robot controller 113.

For example, the camera 214 can be positioned to capture images and/or video of the robot 103 while a human draws, defines, etc. one or more boundaries for the robot 103 based on the images and/or video captured by the camera 214. The example computer vision processor 220 of FIG. 2 uses machine vision analyses to analyze movements, positions, etc. of the robot 103 for compliance with the boundary(-ies) during training. The computer vision processor 220 sends a message to the robot controller 113 associated with the robot 103 when the robot 103 gets close to violating and/or violates a physical constraint parameter, and the robot controller 113 adjusts its training and/or movement(s) accordingly. In some examples, the camera 214 and/or a cell monitor 222 implements the computer vision processor 220. In some examples, sensors (such as the camera 214) are shared by two or more of the robot controllers 112-117, although their outputs may be separately and/or processed differently by the robot controllers 112, 113, and/or by different computer vision processors 220.

The example model training manager 216 also provides from a model library 224 goal information regarding the sub-task(s) to be performed by the robot controller 112, 113 that is being trained. Example goal information provided from the model library 224 includes, but is not limited to, specific sub-task(s) to be performed, object(s) to be moved, the order that the object(s) are to be moved, from and to information for the object(s) being moved, as well as goal information such as do not crush box, do not hit a human with object(s) and/or robot, order of influence (e.g., previous robot must set object down before robot being trained can pick up the object), aspects of a common task (e.g., part held by robot being trained and another robot is to be held horizontal), etc. For example, the model library defines that the robot is to pick up a screw from location A with arm 1, move the screw with arm 1 to a hole in a hinge at location B, insert tip of screw into the hole with arm 1, and screw the screw in with a driver attachment on arm 2.

The example model training manager 216 also stores models trained by the robot controllers 112, 113 for the robots 102, 103 in the example model library 224. In some examples, the models for a robotic cell are stored together as a group of models. In some examples, a model for a robot, a group of models for a robotic cell can be trained in a lab environment and replicated to a manufacturing environment. In some example, multiple replicas of a model for a robot, a group of models for a robotic cell, etc. may be made into modular environments. The example model library 224 of FIG. 2 may be implemented using any number and/or type(s) of data structures, and may be stored on any number and/or type(s) of non-transitory computer-readable storage device or storage disk such as a memory, a DVD, a CD, a Blu-ray disk, etc. including the data structure(s).

In the illustrated example, the machine learning engines 210 of the example robot controller 112 and the example robot controller 113 are trained autonomously using deep reinforced learning. That is beyond the initial defining of sub-tasks to perform, and physical and/or time constraints, the robot controller 113 can self-train itself autonomous from human control or input. For example, training a robot controller to control a first robot to move a first part from position A to position B, turn the first part over, and hold the first part on top of a second part held by a second robot while a third robot welds the first part to the second part, without the part or the first robot crossing any specified boundary(-ies) (e.g., defined in one or more physical constraint parameters). During training, action(s) determined by the robot controller 112, 113 being trained are carried out, and state change information in response to (e.g., resulting from, caused by, etc.) the action(s) are fed back to the robot controller 112, 113. Example state change information is that the part moved four inches left and 24 inches forward. The robot controller 112, 113 also receives reward information and/or penalty information that represent the success and/or failure of the determined action(s). For example, if a physical and/or time constraint parameter is violated, the robot controller may receive a negative valued penalty indication. The robot controller 112, 113 updates coefficients of the machine learning engine 210 based on the state change information, reward information and/or penalty information. For example, if reward information causes the changes made to the machine learning engine (e.g., coefficients of a convolutional neural network) to be reinforced (e.g., made stronger), while penalty information cases changes made to the machine learning engine to be weakened. Thus, reward actions are more likely to occur again, while penalized actions are less likely to occur again. In examples disclosed herein, deep reinforced learning is extended to learn interdependencies. The robot controller 112, 113 that is not being trained repeats the actions it performed during its training, and/or performed subsequent to training, while the other robot controller 112, 113 is trained. Because the previously trained robot controller 112, 113 is operating while the other robot controller 112, 113 is trained, the being trained robot controller 112, 113 learns the interdependencies of the robot 103 and the robot 102 without separate, special, etc. training for interdependencies. The robot controller 112, 113 being trained learns to perform its sub-task(s) in the presence of other robot(s) that are performing their sub-tasks, thus, learning interdependencies while it learns to carry out its sub-task(s). For example, the robot controller 112, 113 may be trained using the example program of FIG. 4.

In some examples, the robot controllers of a robotic cell are trained in turn, etc. in a chain. Additionally, and/or alternatively, multiple robot controllers of a robotic cell are trained concurrently in parallel at the same time (e.g., at the same time, at least partially overlapping training, etc.) to carry out their sub-task(s) as well as learn their interdependencies. Regardless of how many robots are trained at the same time, interdependencies can be learned without a person having to additionally (e.g., in addition to traditional robot training) train each robot controller with its interdependencies. This leads to significant reductions in time expended, effort, completeness, etc. to install, configure, train, test, etc. a robot and the robotic cell to which the robot belongs.

While an example manner of implementing the training system 200 is illustrated in FIG. 2, one or more of the elements, processes and/or devices illustrated in FIG. 2 may be combined, divided, re-arranged, omitted, eliminated and/or implemented in any other way. Further, the example robot controller 112, the example robot controller 113, the example machine learning engine 210, the example model training manager 216, the example computer vision processor 220, the example robotic cell monitor 222 and/or, more generally, the example training system 200 of FIG. 2 may be implemented by hardware, software, firmware and/or any combination of hardware, software and/or firmware. Thus, for example, any of the example robot controller 112, the example robot controller 113, the example machine learning engine 210, the example model training manager 216, the example computer vision processor 220, the example robotic cell monitor 222 and/or, more generally, the example training system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example robot controller 112, the example robot controller 113, the example machine learning engine 210, the example model training manager 216, the example computer vision processor 220, the example robotic cell monitor 222 and/or, more generally, the example training system 200 is/are hereby expressly defined to include a non-transitory computer-readable storage device or storage disk such as a memory, a DVD, a CD, a Blu-ray disk, etc. including the software and/or firmware. Further still, the example training system 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
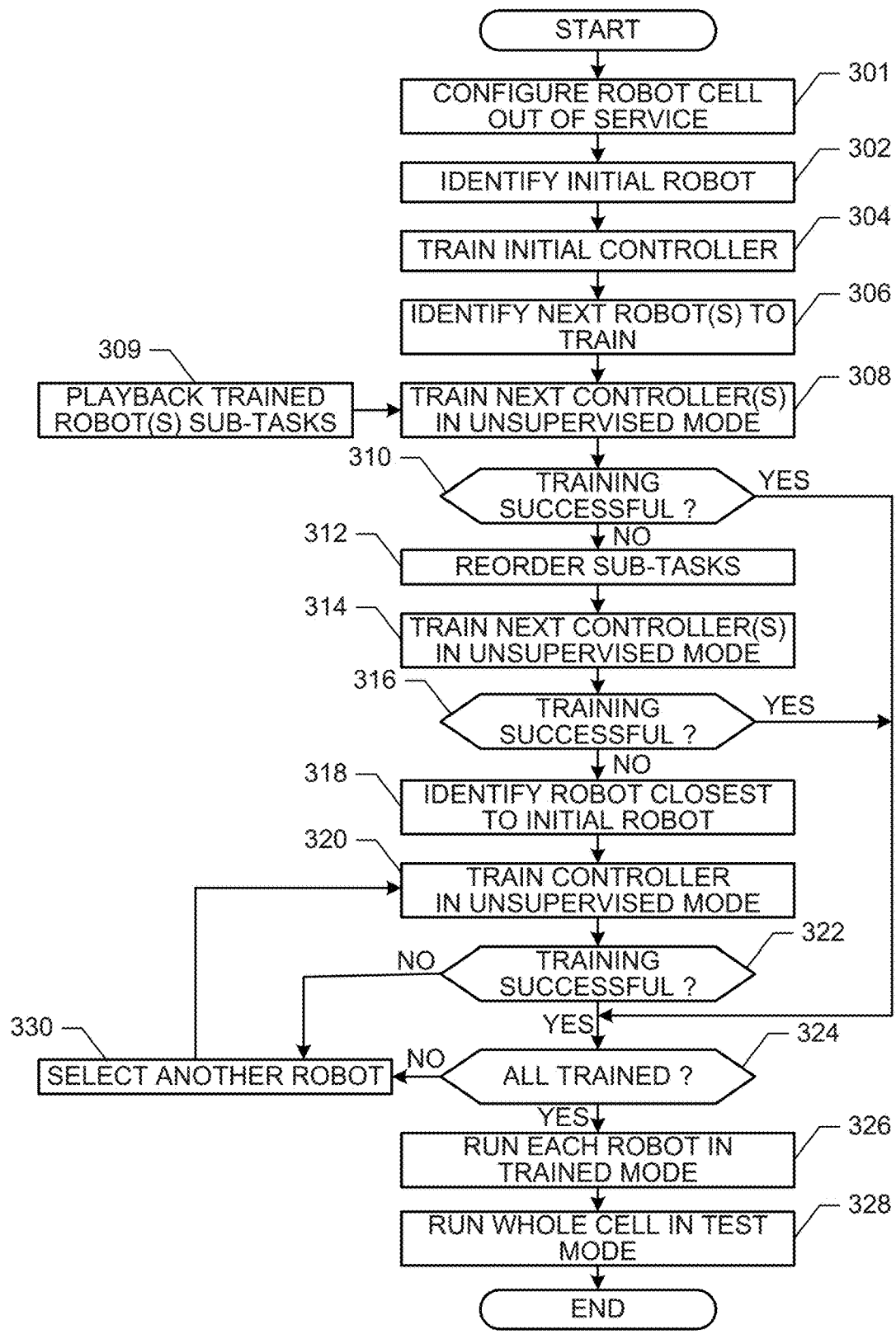
FIG. 3 is a flowchart representative of example hardware logic or machine-readable instructions for implementing the example training system of FIG. 2 to train interdependent autonomous machines.

A flowchart representative of example hardware logic, machine-readable instructions, hardware implemented state machines, and/or any combination thereof for implementing the training system 200 of FIG. 2 is shown in FIG. 3. The machine-readable instructions may be an executable program or portion of an executable program for execution by a computer processor such as the processor 510 shown in the example processor platform 500 discussed below in connection with FIG. 5. The program may be embodied in software stored on a non-transitory computer-readable storage medium such as a compact disc read-only memory (CD-ROM), a floppy disk, a hard drive, a CD, a DVD, a Blu-ray disk, or a memory associated with the processor 510, but the entire program and/or parts thereof could alternatively be executed by a device other than the processor 510 and/or embodied in firmware or dedicated hardware. Further, although the example program is described with reference to the flowchart illustrated in FIG. 3, many other methods of implementing the example training system 200 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 3 may be implemented using executable instructions (e.g., computer and/or machine-readable instructions) stored on a non-transitory computer and/or machine-readable medium such as a hard disk drive, a flash memory, a read-only memory, a CD-ROM, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program of FIG. 3 begins at block 301, with a robotic cell (e.g., the robotic cell 100) being configured into an out of service mode (block 301), For example, the out of service mode (e.g., out of operation mode, a lab environment mode, a development mode, etc.) may be used to train the robots in the robotic cell as discussed herein. An initial (e.g., first) robot (e.g., the robot 102) and its associated robot controller (e.g., the robot controller 112) to train is identified (block 302). For example, a person training a robotic cell (e.g., the robotic cell 100) identifies as the initial robot the robot that performs an initial or first sub-task in a collaborative task to be performed by the robotic cell 100. Example initial or first sub-task includes an action that starts before any other sub-task can be carried out, an action that brings a part into a robotic cell, etc. The initial robot controller 112 is trained manually, manually configured, manually programmed, using, for example, an unsupervised deep reinforced learning training mode, etc. using prior training techniques (block 304). For example, the robot controller 112 may be trained using the example program of FIG. 4. Actions taken by the robot controller 112 during training (e.g., during training sub-tasks, training scenarios, etc.) are recorded by, for example, by the cell monitor 222.

A next (e.g., second) robot (e.g., the robot 103) and its associated robot controller (e.g., the robot controller 113) to train are identified (block 306). For example, a person training the robotic cell 100 identifies the robot 103 as having interdependencies with the initial robot 102. In some examples, more than one next robot is identified, and their robot controllers are trained at the same time as the robot controller 113. The robot controller 113 and potentially other robot controllers associated with other selected next robots are trained using, for example, an unsupervised deep reinforced learning training mode (block 308). The selected next robot controllers are trained while previously trained robot controllers operate their associated robots based on their previously recorded actions collected during training (block 309). That is, the robot controller 113 is trained based on at least (e.g., in the presence of, in parallel with, etc.) an action used to train the initial robot 102. Using, among other things, the physical constraints 218, the model library 224, goals, etc. the selected next robot controllers are trained in an unsupervised deep reinforced learning training mode. For example, the robot controller 113 may be trained using the example program of FIG. 4.

Training is repeated until training of the robot controller(s) converge (block 310). For example, when coefficients of the machine learning engine(s) 210 are no longer changing in a meaningful way. When training fails to converge (block 310), and the complexity of sub-tasks being trained may be impeding training of the selected next robot controller(s) (block 310), sub-tasks are reordered (block 312). The training of the next robot controller(s) is repeated with the reordered sub-tasks using, for example, an unsupervised deep reinforced learning training mode (block 314). If training with the new order of sub-tasks also fails to converge (block 316), the robot that is physically closest to the initial robot is selected (block 318), the robot controller associated with the closest robot to a previously successfully trained robot is trained separately (e.g., while previously recorded actions are played back) using, for example, an unsupervised deep reinforced learning training mode (block 320). For example, the robot controller 113 may be trained using the example program of FIG. 4. In some examples, training of the originally selected next robots can be re-attempted later.

If training of the robot controller associated with the closest robot is successful (block 322), and all robot controllers have been trained (block 324), then all of the robots are further operated in an unsupervised deep reinforced learning training mode at the same time (block 326) to further test and/or adjust their interdependencies. The whole robotic cell is operated in a test mode to verify operation of the robotic cell (block 328), and control exits from the example program of FIG. 3.

Returning to block 324, if not all robots controllers have been trained (block 324), one or more untrained robot controllers are selected for training (block 330), and control returns to block 320 to train the selected robot controller(s) (block 320).

Returning to block 316, if training is successful (block 316), control proceeds to block 324 to determine whether all robot controllers have been successfully trained (block 324).

Returning to block 310, if training is successful (block 310), control proceeds to block 324 to determine whether all robot controllers have been successfully trained (block 324).

The order of selection of robots may be performed in any way. For example, selection may be linear, where each robot is affected by a previous robot, and effects a subsequent node. The order may correspond to, for example, their linear arrangement in a robotic cell. Additionally, and/or alternatively, selection of robots may be hierarchical in which case a robot can affect numerous other robots, and be affected by numerous other robots. In some examples, all robot controllers are first trained separately (e.g., while other robots are not moving) rather than as described above. In some examples, this introduces a delay in how the robots associated with the robot controllers act and/or perform a sub-task. Then, the robot controllers could be further trained in one or more groups, while other robots are active, to enable the robot controllers to train interdependencies.

In some robotic cells, the identification of a training order may be difficult. For example, when there are nuances to a process that cannot be readily observed and may need augmentation. In such examples, further information can be used to identify training order. A human, the model training manager 216, and/or any other processor platform (e.g., the example processor platform 500 of FIG. 5), etc. can process the log to identify a time-synchronized log of events coming out of each robot controller to detect a sequence of actions, to identify whether the messages are informational (e.g., a warning) or indicative of an action, etc. The messages from the different robot controllers in the log can be chronologically ordered, and used to assign an order to the robots. A first robot can be identified as the first robot to perform an action by scanning (e.g., automatically, by a human, etc.) the log. The log can be further scanned for the next action and its associated robot. This robot becomes the next one in the training sequence. The process can be repeated until the entire sequence of robots has been identified. Robots that perform sub-tasks within a very short time duration can be assigned together as potentially a set that is influenced by the same robot and may need to be trained at the same time. The logs could also be scanned over a longer period of time to detect whether the sequence is consistent and can be correlated to the real world consistently. In some examples, a human expert identifies the sequence. In some examples, one or more video cameras (e.g., the video camera 214) capture video and/or images can be used (e.g., manually, automatically, etc.) by the computer vision processor 220 to identify robot motion. The identified robot motion can be used by a human, the model training manager 216, and/or any other processor platform, etc. to identify a sequence of actions, and use that information to identify the sequence of sub-tasks. Additionally, and/or alternatively, sensor information from motion sensors may be used by, for example, the cell monitor 222 to detect actions and sense dependencies between of sub-tasks. These sensors could then be used to detect the sequence over one or more cycles.

Figure 4:
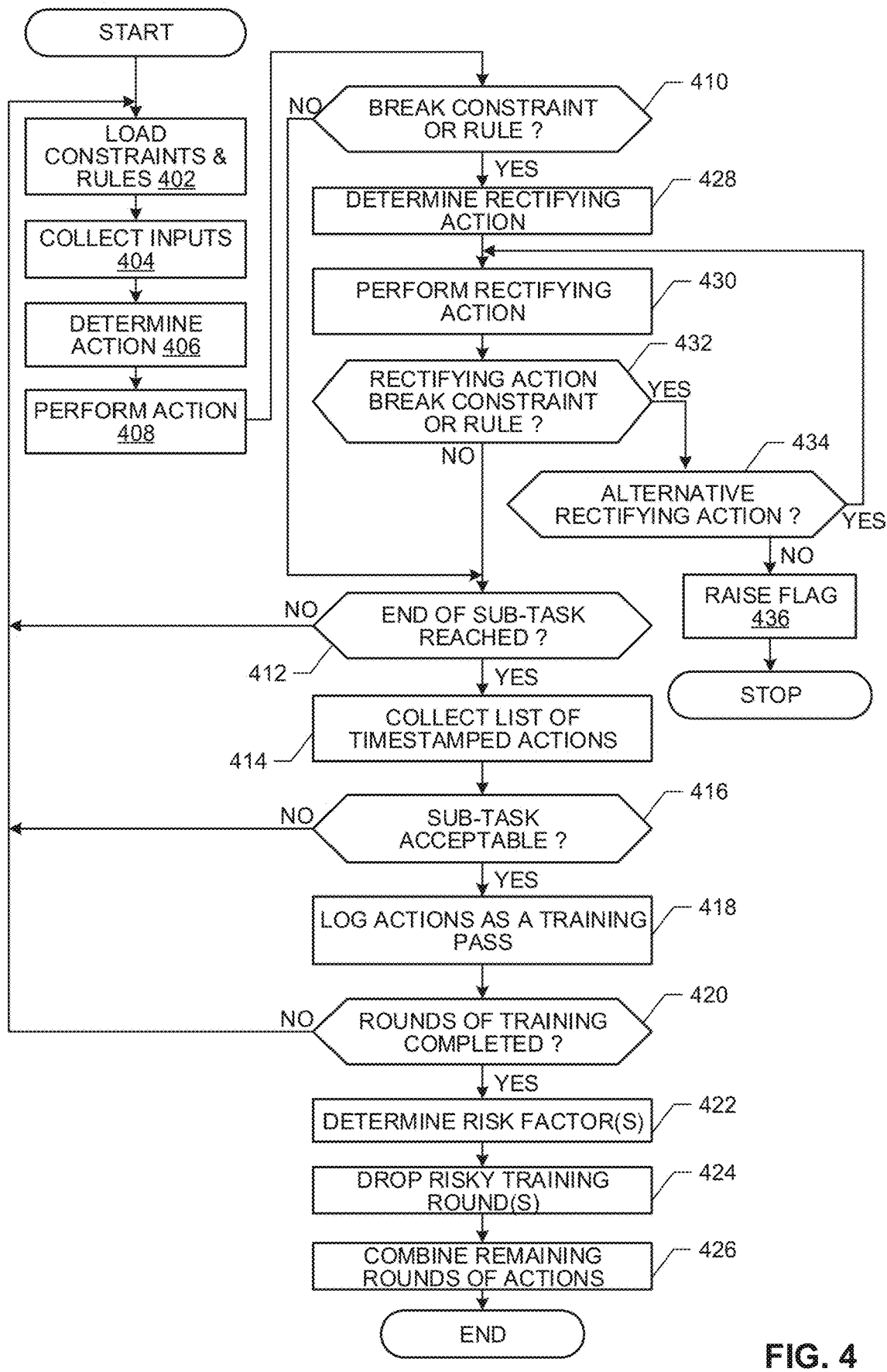
FIG. 4 is a flowchart representative of example hardware logic or machine-readable instructions for training an interdependent autonomous machine.

A flowchart representative of example hardware logic, machine-readable instructions, hardware implemented state machines, and/or any combination thereof for training an interdependent autonomous machine is shown in FIG. 4. The machine-readable instructions may be an executable program or portion of an executable program for execution by a computer processor such as the processor 510 shown in the example processor platform 500 discussed below in connection with FIG. 5. The program may be embodied in software stored on a non-transitory computer-readable storage medium such as a CD-ROM, a floppy disk, a hard drive, a CD, a DVD, a Blu-ray disk, or a memory associated with the processor 510, but the entire program and/or parts thereof could alternatively be executed by a device other than the processor 510 and/or embodied in firmware or dedicated hardware. Further, although the example program is described with reference to the flowchart illustrated in FIG. 4, many other methods of implementing the example training system 200 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an op-amp, a logic circuit, etc.) structured to perform the corresponding operation without executing software or firmware.

As mentioned above, the example processes of FIG. 4 may be implemented using executable instructions (e.g., computer and/or machine-readable instructions) stored on a non-transitory computer and/or machine-readable medium such as a hard disk drive, a flash memory, a read-only memory, a CD-ROM, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

The program of FIG. 4 begins at block 402, with a robot controller obtaining physical constraint information and programmed goals (block 402), and collects environmental sensor data (e.g., from the sensors 214, 215) (block 404). The robot controller determining actions for a sub-task (block 406), and control a robot to perform the action (block 408). If action did not cause the robot to violate a constraint or rule (block 410), the robot controller determines whether sub-task has been completed (block 412).

If the sub-task has been completed (block 412), the robot controller collects a timestamped list of action that were taken for the sub-task (block 414). If the sub-task completed successfully (e.g., no constraint or rule violation) (block 416), the robot controller adds the actions taken for the sub-task to a training log (block 418).

If training is complete (e.g., a predetermined number of training rounds completed, training converged, etc.) (block 420), the robot controller determines whether any training rounds have risk factors (e.g., motion was choppy, too close to a boundary, came close to dropping a box, etc.) (block 422). Training rounds that are risky are dropped (block 424) and the remaining training rounds are combined (block 426), and control exits from the example program of FIG. 4.

Returning to block 420, if a training has not completed acceptably (block 420), control returns to block 402 to performing another training round. At block 402, physical constraint information and programmed goals are (re-) loaded in case they have been changed by a person or program.

Returning to block 412, if the end of training round has not been reach (block 412), control returns to block 402 to performing another training round. At block 402, physical constraint information and programmed goals are (re-) loaded in case they have been changed by a person or program.

Returning to block 410, if an action breaks a constraints and/or rule (block 410), the robot controller determines a rectifying action that would rectify the constraint and/or rule violation that occurred (block 428), and performs the rectifying action (block 430). If the rectifying action did not cause the robot to violate a constraint or rule (block 432), the robot controller determines whether sub-task has been completed (block 412).

If the rectifying action causes the robot to violate a constraint or rule (block 432), the robot controller determines whether an alternative rectifying action that would rectify the constraint and/or rule violation that occurred (block 434), and returns to block 430 to perform the alternative rectifying action.

If at block 434, no alternative rectifying action is identified (block 434), the robot controller raises a flag (block 436), execution of the program of FIG. 4 is stopped, paused, etc. for human and/or programmatic input.

Figure 5:
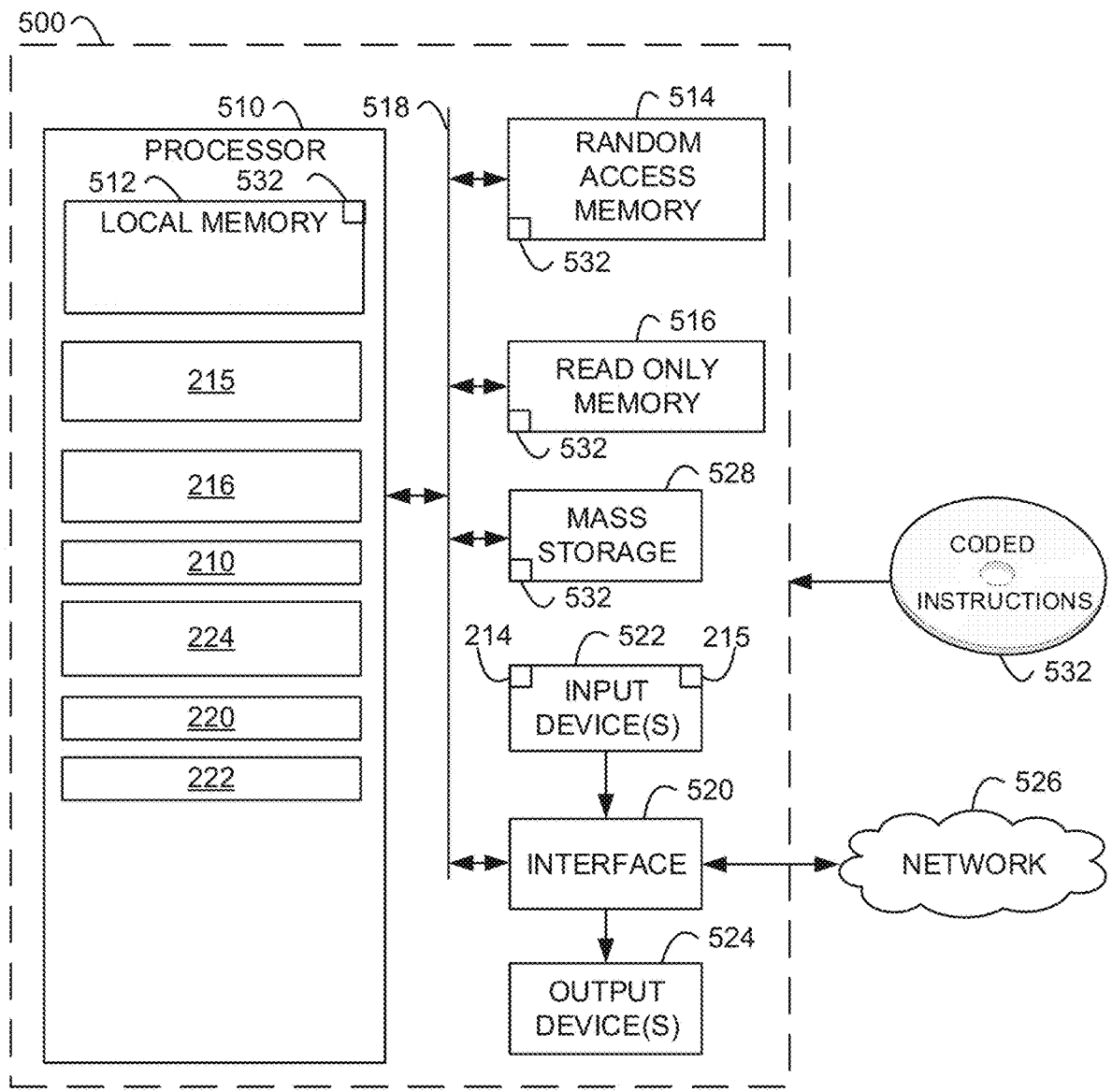
FIG. 5 illustrates an example processor platform structured to execute the example machine-readable instructions of FIG. 3 and/or FIG. 4 to implement the example training system of FIG. 2 to train autonomous machine controllers.

FIG. 5 is a block diagram of an example processor platform 500 structured to execute the instructions of FIG. 3 to implement the training system 200 of FIG. 2. The processor platform 500 can be, for example, a server, a personal computer, a workstation, a self-learning machine (e.g., a neural network), an Internet appliance, or any other type of computing device.

The processor platform 500 of the illustrated example includes a processor 510. The processor 510 of the illustrated example is hardware. For example, the processor 510 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example robot controller 113, the example robot controller 112, the example machine learning engine 210, the example model training manager 216, the example computer vision processor 220, and the example robotic cell monitor 222.

The processor 510 of the illustrated example includes a local memory 512 (e.g., a cache). The processor 510 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a peripheral component interconnect (PCI) express interface.

In the illustrated example, one or more input devices 522 are connected to the interface circuit 520. The input device(s) 522 permit(s) a user to enter data and/or commands into the processor 510. The input device(s) can be implemented by, for example, an audio sensor, a microphone, a camera (still or video), a keyboard, a button, a mouse, a touchscreen, a track-pad, a trackball, isopoint and/or a voice recognition system, the camera 214, the motion sensor 215.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, CD drives, Blu-ray disk drives, redundant array of independent disks (RAID) systems, and DVD drives.

Coded instructions 532 including the coded instructions of FIG. 3 and/or the coded instructions of FIG. 4 may be stored in the mass storage device 528, in the volatile memory 514, in the non-volatile memory 516, and/or on a removable non-transitory computer-readable storage medium such as a CD-ROM or a DVD.

From the foregoing, it will be appreciated that example methods, apparatus and articles of manufacture have been disclosed that train interdependent autonomous machines. From the foregoing, it will be appreciated that methods, apparatus and articles of manufacture have been disclosed that enhance the operations of groups of autonomous machines by self-training them to accommodate interdependencies in their sub-task(s), thereby reducing risks and/or likelihoods associated with a failure of the group that requires human intervention to rectify. Such failures can have significant impacts, especially in manufacturing environments. The disclosed methods, apparatus and articles of manufacture improve the efficiencies of groups of interdependent autonomous machines by using unsupervised training of the autonomous machines allowing groups of autonomous machines to operate faster, with less errors, with less faults, using less floor space, with lower training complexity, with less training time, etc. The disclosed methods, apparatus and articles of manufacture improve the scalability of groups of interdependent autonomous machines Furthermore, example methods, apparatus, and/or articles of manufacture disclosed herein identify and overcome inaccuracies and inability in the prior art to self-learn interdependencies between autonomous machines. The disclosed methods, apparatus and articles of manufacture are accordingly directed to one or more improvement(s) in the functioning of a computer.

Example methods, apparatus, and articles of manufacture to train interdependent autonomous machines are disclosed herein. Further examples and combinations thereof include at least the following.

Example 1 is a method that includes performing an action of a first sub-task of a collaborative task with a first collaborative robot in a robotic cell while a second collaborative robot operates in the robotic cell according to a first recorded action of the second collaborative robot, the first recorded action of the second collaborative robot recorded while a second robot controller associated with the second collaborative robot is trained to control the second collaborative robot to perform a second sub-task of the collaborative task, and training a first robot controller associated with the first collaborative robot based at least on a sensing of an interaction of the first collaborative robot with the second collaborative robot while the action of the first sub-task is performed by the first collaborative robot and the second collaborative robot operates according to the first recorded action.

Example 2 is the method of example 1, further including performing the first sub-task with the first collaborative robot while the second collaborative robot performs the second sub-task to perform the collaborative task.

Example 3 is the method of example 2, wherein the collaborative task of the robotic cell is a manufacturing task in a manufacturing environment.

Example 4 is the method of example 2, wherein the first sub-task is different from the second sub-task, and wherein the first sub-task and the second sub-task are interdependent.

Example 5 is the method of example 1, further including training the first robot controller to control the first collaborative robot based at least on the sensing of the interaction of the first collaborative robot with the second collaborative robot while the second collaborative robot performs a second recorded action of the second collaborative robot, the second recorded action of the second collaborative robot recorded while the second robot controller is trained to control the second collaborative robot to perform a third sub-task of the collaborative task.

Example 6 is the method of example 1, further including training the first robot controller to control the first collaborative robot based at least on the sensing of the interaction of the first collaborative robot with the second collaborative robot while the second collaborative robot performs the first recorded action of the second collaborative robot a second time.

Example 7 is the method of example 1, wherein the training the second robot controller includes applying deep reinforced learning of a convolutional neural network.

Example 8 is the method of example 1, wherein the sensing of the interaction of the first collaborative robot with the second collaborative robot includes a boundary violation by the first collaborative robot.

Example 9 is the method of example 8, further including processing outputs of a camera to identify the boundary violation.

Example 10 is the method of example 1, wherein the training of the second robot controller is based on at least one of a sub-task to perform, a physical constraint, a reward for an action, or a penalty for an action defined for the second collaborative robot.

Example 11 is a system that includes a cell monitor to record a first action of a first collaborative robot of a robotic cell while a first robot controller associated with the first collaborative robot is trained to perform a first sub-task of a collaborative task in the robotic cell, and a second robot controller to train to control a second collaborative robot to perform a second sub-task of the collaborative task based at least on a sensing of an interaction of the first collaborative robot with the second collaborative robot while the first collaborative robot performs the recorded first action.

Example 12 is the system of example 11, wherein a manufacturing task in a manufacturing environment includes the first sub-task and the second sub-task.

Example 13 is the system of example 11, wherein the first sub-task is different from the second sub-task, and wherein the first sub-task and the second sub-task are interdependent sub-tasks of a collaborative task.

Example 14 is the system of example 11, wherein the cell monitor is to record a second action of the first collaborative robot while the first robot controller is trained to perform a third sub-task, and the second robot controller to train to control the second collaborative robot to perform the second sub-task while first collaborative robot performs the recorded first action and the recorded second action.

Example 15 is the system of example 14, wherein the second action includes the first action, and the third sub-task includes the first sub-task.

Example 16 is the system of example 11, further including a camera to capture and image of the robotic cell, and a computer vision processor to sense the interaction of the first collaborative robot with the second collaborative robot as a boundary violation by the second collaborative robot, wherein training the first robot controller is based at least in part on the boundary violation.

Example 17 is a non-transitory computer-readable storage medium comprising instructions that, when executed, cause a machine to at least perform an action of a first sub-task of a collaborative task with a first collaborative robot in a robotic cell while a second collaborative robot operates in the robotic cell according to a first recorded action of the second collaborative robot, the first recorded action of the second collaborative robot recorded while a second robot controller associated with the second collaborative robot is trained to control the second collaborative robot to perform a second sub-task of the collaborative task, and train a first robot controller associated with the first collaborative robot based at least on a sensing of an interaction of the first collaborative robot with the second collaborative robot while the action of the first sub-task is performed by the first collaborative robot and the second collaborative robot operates according to the first recorded action.

Example 18 is the non-transitory computer-readable storage medium of example 17, including further instructions that, when executed, cause the machine to train the first robot controller to control the first collaborative robot based at least on the sensing of the interaction of the first collaborative robot with the second collaborative robot while the second collaborative robot performs a second recorded action of the second collaborative robot, the second recorded action of the second collaborative robot recorded while the second robot controller is trained to control the second collaborative robot to perform a third sub-task of the collaborative task.

Example 19 is the non-transitory computer-readable storage medium of example 17, including further instructions that, when executed, cause the machine to train the first robot controller to control the first collaborative robot based at least on the sensing of the interaction of the first collaborative robot with the second collaborative robot while the second collaborative robot performs the first recorded action of the second collaborative robot a second time.

Example 20 is the non-transitory computer-readable storage medium of example 17, wherein the sensing of the interaction of the first collaborative robot with the second collaborative robot includes a boundary violation by the first collaborative robot.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    performing an action of a first sub-task of a collaborative task with a first collaborative robot in a robotic cell while a second collaborative robot operates in the robotic cell according to a first recorded action of the second collaborative robot, the first recorded action of the second collaborative robot recorded while a second robot controller associated with the second collaborative robot is trained to control the second collaborative robot to perform a second sub-task of the collaborative task; and
    training a first robot controller associated with the first collaborative robot based at least on a sensing of an interaction of the first collaborative robot with the second collaborative robot while the action of the first sub-task is performed by the first collaborative robot and the second collaborative robot operates according to the first recorded action.

2. The method of claim 1, further including performing the first sub-task with the first collaborative robot while the second collaborative robot performs the second sub-task to perform the collaborative task.

3. The method of claim 2, wherein the collaborative task of the robotic cell is a manufacturing task in a manufacturing environment.

4. The method of claim 2, wherein the first sub-task is different from the second sub-task, and wherein the first sub-task and the second sub-task are interdependent.

5. The method of claim 1, further including training the first robot controller to control the first collaborative robot based at least on the sensing of the interaction of the first collaborative robot with the second collaborative robot while the second collaborative robot performs a second recorded action of the second collaborative robot, the second recorded action of the second collaborative robot recorded while the second robot controller is trained to control the second collaborative robot to perform a third sub-task of the collaborative task.

6. The method of claim 1, further including training the first robot controller to control the first collaborative robot based at least on the sensing of the interaction of the first collaborative robot with the second collaborative robot while the second collaborative robot performs the first recorded action of the second collaborative robot a second time.

7. The method of claim 1, wherein the training the second robot controller includes applying deep reinforced learning of a convolutional neural network.

8. The method of claim 1, wherein the sensing of the interaction of the first collaborative robot with the second collaborative robot includes a boundary violation by the first collaborative robot.

9. The method of claim 8, further including processing outputs of a camera to identify the boundary violation.

10. The method of claim 1, wherein the training of the second robot controller is based on at least one of a sub-task to perform, a physical constraint, a reward for an action, or a penalty for an action defined for the second collaborative robot.

11. A system, comprising:
    cell monitor circuitry to record a first action of a first collaborative robot of a robotic cell while a first robot controller associated with the first collaborative robot is trained to perform a first sub-task of a collaborative task in the robotic cell; and
    second robot controller circuitry to train to control a second collaborative robot to perform a second sub-task of the collaborative task based at least on a sensing of an interaction of the first collaborative robot with the second collaborative robot while the first collaborative robot performs the recorded first action.

12. The system of claim 11, wherein a manufacturing task in a manufacturing environment includes the first sub-task and the second sub-task.

13. The system of claim 11, wherein the first sub-task is different from the second sub-task, and wherein the first sub-task and the second sub-task are interdependent sub-tasks of a collaborative task.

14. The system of claim 11, wherein:
the cell monitor circuitry is to record a second action of the first collaborative robot while the first robot controller is trained to perform a third sub-task; and
the second robot controller circuitry is to be trained to control the second collaborative robot to perform the second sub-task while first collaborative robot performs the recorded first action and the recorded second action.

15. The system of claim 14, wherein the second action includes the first action, and the third sub-task includes the first sub-task.

16. The system of claim 11, further including:
a camera to capture an image of the robotic cell; and
a computer vision processor to sense the interaction of the first collaborative robot with the second collaborative robot as a boundary violation by the second collaborative robot,
wherein training the first robot controller is based at least in part on the boundary violation.

17. A non-transitory computer-readable storage medium comprising instructions that, when executed, cause a machine to at least:
perform an action of a first sub-task of a collaborative task with a first collaborative robot in a robotic cell while a second collaborative robot operates in the robotic cell according to a first recorded action of the second collaborative robot, the first recorded action of the second collaborative robot recorded while a second robot controller associated with the second collaborative robot is trained to control the second collaborative robot to perform a second sub-task of the collaborative task; and
train a first robot controller associated with the first collaborative robot based at least on a sensing of an interaction of the first collaborative robot with the second collaborative robot while the action of the first sub-task is performed by the first collaborative robot and the second collaborative robot operates according to the first recorded action.

18. The non-transitory computer-readable storage medium of claim 17, including further instructions that, when executed, cause the machine to train the first robot controller to control the first collaborative robot based at least on the sensing of the interaction of the first collaborative robot with the second collaborative robot while the second collaborative robot performs a second recorded action of the second collaborative robot, the second recorded action of the second collaborative robot recorded while the second robot controller is trained to control the second collaborative robot to perform a third sub-task of the collaborative task.

19. The non-transitory computer-readable storage medium of claim 17, including further instructions that, when executed, cause the machine to train the first robot controller to control the first collaborative robot based at least on the sensing of the interaction of the first collaborative robot with the second collaborative robot while the second collaborative robot performs the first recorded action of the second collaborative robot a second time.

20. The non-transitory computer-readable storage medium of claim 17, wherein the sensing of the interaction of the first collaborative robot with the second collaborative robot includes a boundary violation by the first collaborative robot.

* * * * *